United States Patent
Bereznitski et al.

(10) Patent No.: US 8,360,686 B2
(45) Date of Patent: Jan. 29, 2013

(54) PIPELAYING VESSEL

(75) Inventors: Alexei Bereznitski, Delft (NL); Joop Roodenburg, Delft (NL)

(73) Assignee: ITREC B.V., Schiedam (NL)

( * ) Notice: Subject to any disclaimer, the term of this patent is extended or adjusted under 35 U.S.C. 154(b) by 168 days.

(21) Appl. No.: 12/665,280

(22) PCT Filed: Jun. 18, 2007

(86) PCT No.: PCT/NL2007/000152
§ 371 (c)(1),
(2), (4) Date: Dec. 17, 2009

(87) PCT Pub. No.: WO2008/156352
PCT Pub. Date: Dec. 24, 2008

(65) Prior Publication Data
US 2010/0158613 A1    Jun. 24, 2010

(51) Int. Cl.
*F16L 1/12* (2006.01)
(52) U.S. Cl. ............. 405/166; 405/158; 405/168.3; 405/168.4
(58) Field of Classification Search ............... 405/158, 405/166, 168.1, 168.2, 168.3, 168.4
See application file for complete search history.

(56) References Cited

U.S. PATENT DOCUMENTS

| 3,965,713 | A | | 6/1976 | Horton |
| 4,215,950 | A | * | 8/1980 | Stevenson ............... 405/168.4 |
| 4,594,871 | A | * | 6/1986 | de Boer .................. 405/168.3 |
| 5,044,825 | A | * | 9/1991 | Kaldenbach ............. 405/166 |
| 6,328,502 | B1 | | 12/2001 | Hickey et al. |
| 2003/0091395 | A1 | * | 5/2003 | Stockstill ................. 405/154.1 |

FOREIGN PATENT DOCUMENTS

| CN | 85 1 05011 A | 12/1986 |
| EP | 0507572 A1 | 10/1992 |
| JP | 48-086283 A | 11/1973 |
| WO | WO-2007/120035 A | 10/2007 |

* cited by examiner

*Primary Examiner* — David Bagnell
*Assistant Examiner* — Benjamin Fiorello
(74) *Attorney, Agent, or Firm* — Birch, Stewart, Kolasch & Birch, LLP

(57) ABSTRACT

An apparatus for continuously laying a pipeline on the floor of a body of water from a pipelaying vessel includes: a generally cylindrical reel with an axis upon which the pipeline is wound, a stinger provided at the stern of the vessel for guiding the lowered pipeline, a launch device configured to control lowering of the pipeline over the stinger of the vessel and into the body of water. This apparatus further includes a frame supporting the reel and the launch device, adapted to be moveable with respect to the vessel in the longitudinal direction of the pipeline, and a tension device to be mounted between the frame and the vessel, adapted to control the pipeline tension in a predetermined tension range during pipelaying.

16 Claims, 2 Drawing Sheets

PIPELAYING VESSEL

BACKGROUND OF THE INVENTION

1. Field of the Invention

The present invention relates to an apparatus for continuously laying a pipeline on the floor of a body of water from a pipelaying vessel. The apparatus comprises a reel upon which a pipeline to be laid is wound. The apparatus also includes a stinger or other curved path pipeline guiding arrangement (e.g. a curved track, a wheel or chute) provided at the stern of the vessel for guiding the lowered pipeline. The apparatus further includes launch means for the controlled lowering of the pipeline over the stinger of said vessel and into the body of water.

2. Description of Background Art

Such a vessel is well known, e.g. from U.S. Pat. No. 3,965,713. A reel with a substantially vertical axis is provided, and the launch means in this embodiment are formed by tensioning means. During pipelaying, it is important to control the pipeline tension in a predetermined tension range. There is a risk of overstressing (too much tension in a pipe) or buckling (too low tension) in the pipeline section that has left the reel and has not yet reached the floor of the body of water. In particular the pipeline sections in the vicinity of the floor of the body of water and in the vicinity of the surface of the body of water can be subjected to stresses deviating from what is acceptable.

To keep the vessel at a desired position with respect to the lowered pipeline, often anchors are used. Multiple anchors and anchor handler vessel(s) are then required to perform the pipelaying operation and to control the position of the vessel accurately. A large offset is not desired for pipelaying operations, because it will result in pipeline tension outside the predetermined allowable tension range. Hence, accurate anchoring is required to control the pipeline tension.

A disadvantage of such a positioning system is that anchor handling is time-consuming and complex.

Therefor, alternatively the pipelaying vessel is kept in place by a dynamic positioning system controlling a suitable propulsion system of the vessel, e.g. with multiple thrusters, such as described in U.S. Pat. No. 6,328,502. However, a disadvantage of such systems is the limited accuracy. The actual position of the vessel may vary up to several meters offset from the desired position, which is found to be problematic in pipelaying, in particular when pipelaying is relatively shallow water, e.g. the North Sea.

SUMMARY OF THE INVENTION

It is an aim of the present invention to provide yet an alternative solution to control the pipeline tension during pipelaying.

This aim is achieved by an apparatus according to the present invention, wherein a frame is provided for supporting the reel and the launch means, adapted to be moveable with respect to the vessel in the longitudinal direction of the pipeline, and by a tension device to be mounted between the frame and the vessel, adapted to control the pipeline tension in a predetermined tension range during pipelaying.

The apparatus according to the invention preferably comprises a reel, which may have a vertically extending axis or alternatively a horizontally extending axis. In an alternative embodiment, or in combination with a reel, the pipeline is stored in spooled configuration in a carrousel as is also known in the art. The carrousel is then also supported on the common frame.

The launch means for controlled lowering of the pipeline may comprise a pipeline tensioner, but could also alternatively be formed by control means controlling the operation of the reel and thereby the pipe launch rate.

By supporting both the reel and the launch means on a moveable frame, the position of the combination of these can vary or be varied with respect to the vessel. As will be explained below this allows to control the pipeline tension.

The frame may be made moveable with respect to the vessel by the provision of wheels, bearings, e.g. sliding bearings, etc. The frame should at least support the reel and the launch means, but could also support other equipment, such as a straigthener.

The pipeline tension can be controlled actively during pipelaying by the tension device which is then mounted between the frame and the vessel. Such tension device could e.g. comprise a cylinder (such as in a heave compensation device) or a winch. An advantage of the invention is that the vessel propulsion can be of lower complexity and/or is used with reduced intensity compared to normal DP-controlled pipelaying vessels.

Another advantage of the apparatus according to the invention is that it is easy to install and remove. The frame supporting the reel, launch means and possibly other equipment can be placed on any suitable type of vessel as a 'modular unit', and may only be connected to the vessel via the tension device.

The tension device can easily (passively or actively) control the position of the frame with respect to the lowered pipeline so as to maintain a more or less constant pipeline tension.

The apparatus according to the invention can in particular be used with a non-dedicated pipelaying vessel, most importantly with an offshore supply vessel (OSV). In the offshore industry these OSV vessels commonly are used to supply offshore oil platforms. The primary function for most of these vessels is transportation of goods and personnel to and from the offshore oil platforms. In general most of these vessel have a large open elongated deck at the rear of the vessel.

In a preferred embodiment of the invention, the apparatus according to the invention is applied in combination with a known dynamic positioning system, the tension device only has to compensate for the inaccuracy of the dynamic positioning system. In this embodiment, the effective stroke of the tensioning device, thus the longitudinal motion range of the common frame, can be limited.

Although the appended claims are directed to an apparatus for continuously laying a pipeline on the floor of a body of water, the apparatus according to the invention is also suitable for raising a pipeline from a body of water to a movable floating pipelaying vessel. The pipe is raised via the stinger or the like and spooled on the reel, while according to the invention a tension device controls the pipeline tension in a predetermined tension range during pipelaying.

BRIEF DESCRIPTION OF THE DRAWINGS

The invention is further explained with reference to the drawings, in which.

DETAILED DESCRIPTION OF THE PREFERRED EMBODIMENTS

Figure 1:
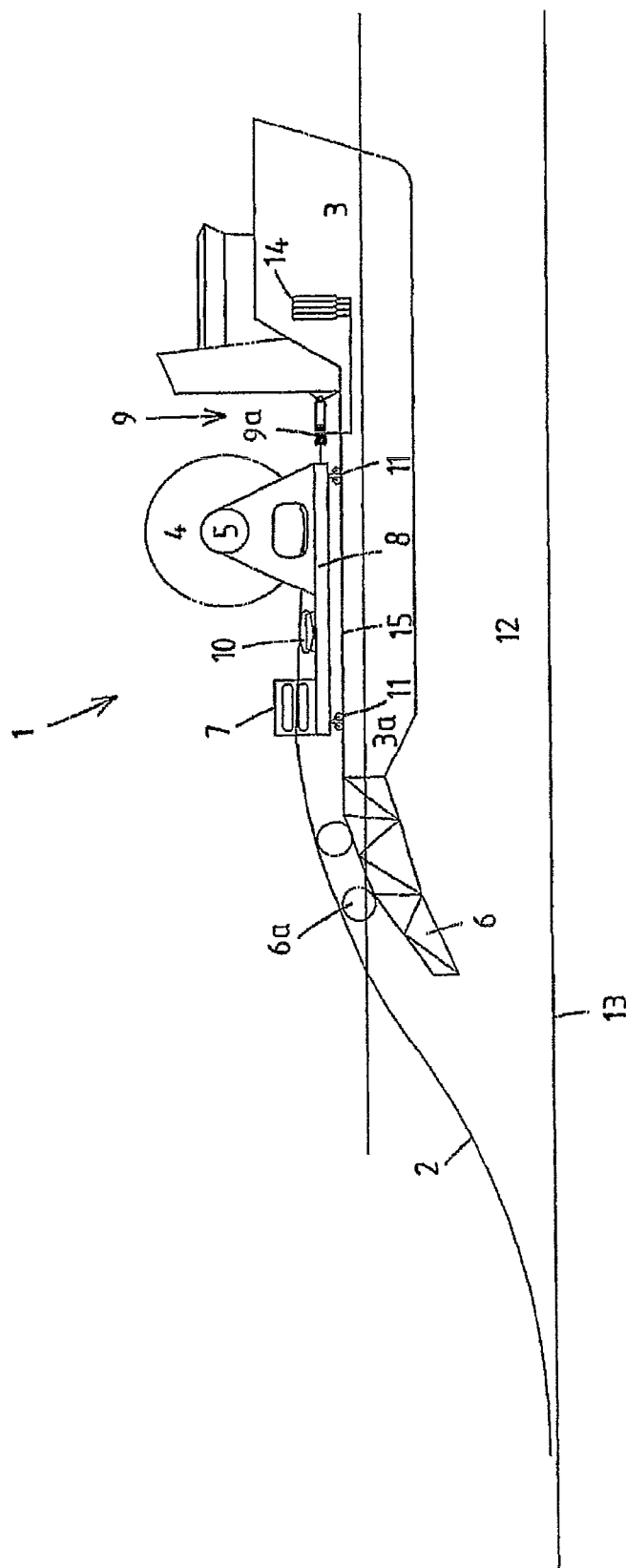
FIG. 1 is a schematic representation of a first embodiment of an apparatus for continuously laying a pipeline on the floor of a body of water according to the invention.

In FIG. 1 an apparatus 1 according to the invention is shown, for continuously laying a pipeline 2 from a pipelaying vessel 3 into a body of water 12.

It is noted that the vessel 3 need not be a dedicated pipelaying vessel. In fact it is envisaged that the vessel 3 can be an offshore supply vessel (OSV) as depicted here, having an open deck 15 at the rear of the vessel.

The apparatus 1 in this example comprises a cylindrical reel 4 with a horizontally extending axis 5, perpendicular to the longitudinal direction of the pipeline 2 which is laid. The pipeline 2 to be laid is spooled on the reel 4.

A stinger 6 is mounted at the stern portion 3a of the vessel 3 and guides the pipeline in a curved path during lowering of the pipeline 2 into the body of water 12 onto the floor 13 of the body of water.

In the shown embodiment, the stinger 6 comprises rollers 6a (exaggerated in this drawing) to support and guide the pipeline 2 as is known in the art.

The apparatus 1 further comprises a pipeline engaging tensioner 7 (possibly several tensioners in series), forming launch means for the controlled lowering of the pipeline 2 over the stinger 6 of the vessel 3 into the body of water 12. The pipeline tensioner(s) 7 basically allows to support the weight of the lowered pipeline 2 between the vessel 3 and the floor 13 of the body of water. As is known in the art, the tensioner 7 comprises multiple tracks with pipeline engaging friction elements. The tracks are arranged so as to frictionally engage on the pipeline exterior. Also each track has associated track drive means that allow the controlled motion of the pipeline.

In the shown embodiment, a straightener 10 is provided between the reel 4 and the tensioner 7 to straighten the curved pipeline 2. In particular when rigid pipes are spooled on the reel 4, a straightener 10 is applied. The apparatus according to the invention can be embodied to be suitable both for laying rigid pipeline and/or flexible pipeline to be wound on the reel.

The reel 4, the straightener 10 and the tensioner 7 are supported by a common frame 8. The frame 8 is moveable with respect to the vessel 3 in the longitudinal direction of the pipeline 2.

In this example, the frame 8 is provided with wheels 11 which run on the open deck 15 of the vessel. In an alternative, the deck could be provided with (demountable) rails in the longitudinal direction over which the frame 11 is movable, e.g. via rollers or other bearing structure (e.g. slide bearings).

The frame 8 is connected to the vessel 3 via a tension device 9 which allows longitudinal displacement of the frame 8 with respect to the deck of the vessel during pipelaying so as to control, or at least assist the control of, the pipeline tension during pipelaying, and to maintain the pipeline tension within a predetermined tension range during the pipelaying.

Here, the tension device 9 is embodied similar to a heave-compensation device used, e.g. in offshore cranes, drilling systems and the like. The device 9 includes a cylinder 9a arranged between the vessel 3 and the frame 8, the cylinder 9a having a variable volume chamber filled with liquid. This chamber is interconnected via a separating cylinder (not shown) to a bank of pressurized gas cylinders 14, thereby maintaining a constant pressure within the variable volume chamber independent of the volume of said chamber, thus independent of the position of the associated piston of said cylinder 9a, and thus independent of the position of the frame 8.

The skilled person will appreciate that many alternative constant pressure arrangements can be employed, either passive or actively controlled.

Figure 2:
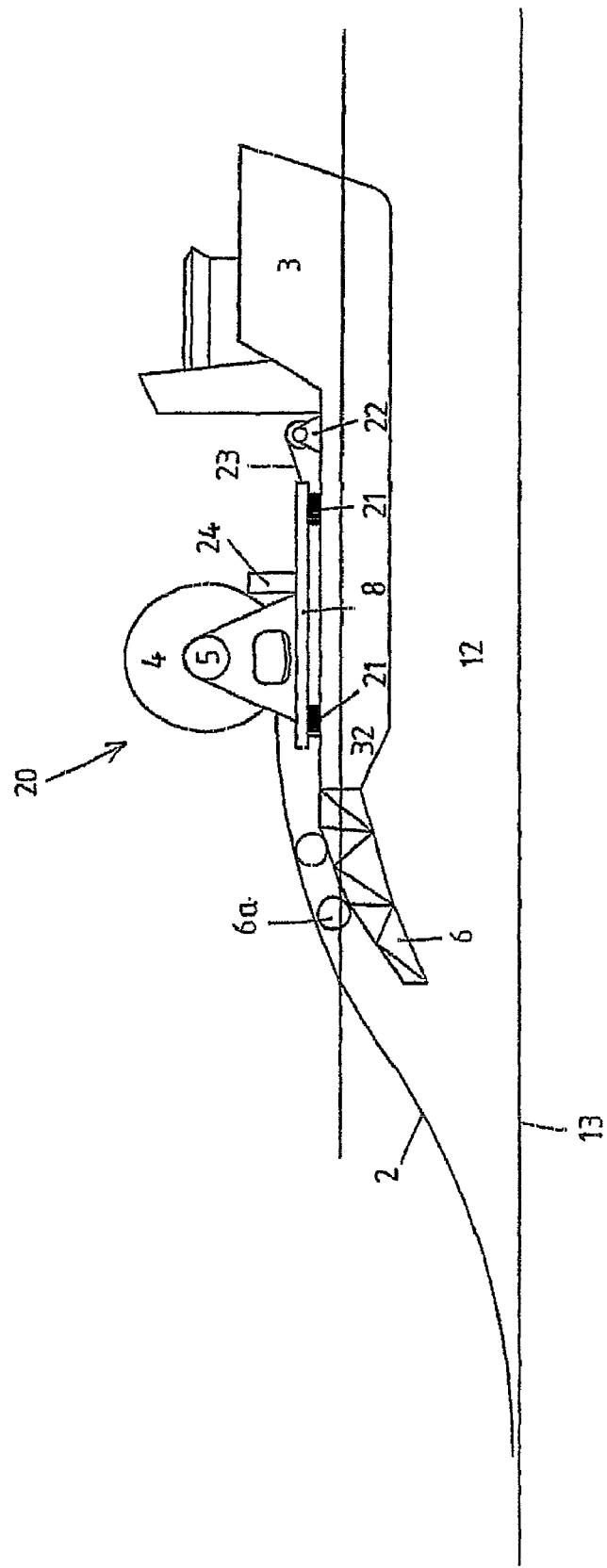
FIG. 2 is a schematic representation of a second embodiment of an apparatus for continuously laying a pipeline on the floor of a body of water according to the invention.

In FIG. 2, an alternative apparatus 20 according to the invention is shown. The same components are indicated with the same reference numbers. Pipeline 2 is laid from a pipelaying vessel 3 into a body of water 12. The apparatus 20 comprises a reel 4 with a horizontally extending axis 5. A stinger 6 is provided at the stern 3a of the vessel 3 for guiding the lowered pipeline 2.

Reel 4 is driven by drive means (not shown, e.g. one or more electric motors), which are controlled by associated reel motion control means 24. In general, reels are driven to facilitate spooling and unspooling of the pipeline 2. In this embodiment, the control means 24 allow to accurately control the rotation of the reel 4 such that the reel 4 itself acts as launch means to support the weight of the pipeline between the vessel and the floor 13 (seabed) and for the controlled lowering of the pipeline 2. Thereby, the control means 24 control the pipe launch rate and a pipeline tensioner (as tensioner 7 in FIG. 1) is not needed in this embodiment. The reel 4 and its drive and control means 24 are supported by a frame 8.

The frame 8 is moveable with respect to the vessel 3 via bearings 21. Sliding bearings may be used, e.g. hydrostatic bearings, or other bearings in a suitable structure.

A tension device 22, 23 is mounted between frame 8 and vessel 3 to control the pipeline tension within a predetermined tension range during pipelaying. In the embodiment shown in FIG. 2, tension device 22, 23 comprises a winch 22 mounted on the vessel and a cable 23 extending between the winch 22 and the frame 8. The winch 22 has associated drive and control means, e.g. electric motors with associated controllers, capable of controlling the tension in the cable 23, and thereby controlling the position of the frame 8, and thus the position of the reel 4. Thereby, the tension in the pipeline lowered from the reel to the body of water is also controlled.

In an alternative (not shown), the frame 8 is supported on the deck 15 via a rack and pinion construction, e.g. the deck being provided with an elongated rack in the longitudinal direction and the frame being provided with a motorized pinion, e.g. with an electric drive. By controlling the rotary motion of the pinion, the position of the frame with respect to the vessel 3 can be controlled such that the pipeline tension is maintained within a predetermined range.

Preferably the frame 8 is provided with lift members, allowing to lift the frame 8 with the reel 4 and launch means in a single lift either to place said frame on the vessel or remove it from the vessel.

The invention claimed is:

1. An apparatus for continuously laying a pipeline on the floor of a body of water by lowering the pipeline from a pipelaying vessel, said apparatus comprising:
    a reel or carrousel adapted to receive the pipeline to be laid in a spooled configuration;
    a curved path pipeline guiding arrangement to be mounted at the stern of the vessel for guiding the pipeline into the body of water;
    a launch device configured to control lowering of the pipeline over the curved path pipeline guiding arrangement of said vessel and into the body of water;
    a frame supporting the reel and the launch device, said frame being adapted so as to be moveable with respect to the vessel in the longitudinal direction of the pipeline; and
    a tension device to be mounted between the frame and the vessel, said tension device being adapted to allow displacement of the frame, the reel and the launch device together in the longitudinal direction of the pipeline with respect to the vessel during pipelaying, in order to displace the pipeline in the longitudinal direction of the pipeline with respect to the vessel, so as to control the pipeline tension during pipelaying, and to maintain the pipeline tension within a predetermined tension range during pipelaying.

2. The apparatus according to claim 1, wherein the launch device comprises one or more pipeline tensioners engaging on the pipeline so as to support the weight of the lowered pipeline.

3. The apparatus according to claim 1, wherein the launch device comprises a reel drive configured to rotate said reel and a reel motion control device configured to control the reel drive.

4. The apparatus according to claim 3, wherein the reel drive comprises one or more electric motors.

5. The apparatus according to claim 1, wherein the frame is provided with wheels to be moveable with respect to the vessel.

6. The apparatus according to claim 5, wherein the wheels are adapted to run on a deck of the vessel.

7. The apparatus according to claim 1, wherein the frame is provided with bearings to be moveable with respect to the vessel.

8. The apparatus according to claim 1, wherein the tension device is adapted to be operative together with a dynamic positioning system.

9. The apparatus according to claim 8, wherein the dynamic positioning system is a dynamic position system of the vessel.

10. The apparatus according to claim 1, wherein the frame is provided with lift members, allowing to lift the frame with the reel or carrousel and launch device in a single lift to place said frame on the vessel or remove it from the vessel.

11. The apparatus according to claim 1, wherein the curved path pipeline guiding arrangement is a stinger.

12. The apparatus according to claim 1, wherein the tension device comprises a winch to be mounted on the vessel and a cable extending between the winch and the frame, and wherein the winch has associated drives and controllers capable of controlling the position of the frame.

13. The apparatus according to claim 1, wherein the tension device comprises a cylinder arranged between the vessel and the frame, and a bank of pressurized gas cylinders, wherein the cylinder arranged between the vessel and the frame has a variable volume chamber filled with liquid which is interconnected to the bank of pressurized gas cylinders, thereby maintaining a constant pressure within the variable volume chamber independent of the volume of said chamber.

14. A vessel in combination with the apparatus according to claim 1, wherein the vessel is an offshore supply vessel.

15. A method for continuously laying a pipeline on the floor of a body of water by lowering said pipeline from a pipelaying vessel, said method comprising the step of using a vessel equipped with an apparatus according to claim 1.

16. The method according to claim 15, wherein the apparatus is removed from said vessel, so as to allow use of the vessel for other purposes.

* * * * *